(12) United States Patent
Kubota et al.

(10) Patent No.: US 10,320,271 B2
(45) Date of Patent: Jun. 11, 2019

(54) ELECTRIC MACHINE (71) Applicant: SUZUKI MOTOR CORPORATION, Shizuoka (JP)

(72) Inventors: Yoshihisa Kubota, Shizuoka (JP); Masahiro Aoyama, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 505 days.

(21) Appl. No.: 15/042,919

(22) Filed: Feb. 12, 2016

(65) Prior Publication Data
US 2016/0248307 A1 Aug. 25, 2016

(30) Foreign Application Priority Data

Feb. 20, 2015 (JP) .................. 2015-031589

(51) Int. Cl.
H02K 16/02 (2006.01)
H02K 3/18 (2006.01)
H02K 3/28 (2006.01)
H02K 11/042 (2016.01)
H02K 19/36 (2006.01)
H02K 51/00 (2006.01)

(52) U.S. Cl.
CPC .............. *H02K 16/02* (2013.01); *H02K 3/28* (2013.01); *H02K 19/36* (2013.01); *H02K 51/00* (2013.01)

(58) Field of Classification Search
CPC .......... H02K 16/02; H02K 19/36; H02K 3/28; H02K 51/00; H02K 11/042; H02K 3/18
USPC ...................................... 310/68 D
See application file for complete search history.

(56) References Cited

U.S. PATENT DOCUMENTS

| | | | | | |
|---|---|---|---|---|---|
| 3,422,292 | A | * | 1/1969 | Port ...................... | H02K 24/00 310/12.21 |
| 4,058,746 | A | * | 11/1977 | Mole et al. ............ | H02K 55/00 310/10 |
| 4,488,053 | A | * | 12/1984 | Cronin .................... | F16H 3/724 290/4 C |
| 6,570,278 | B1 | * | 5/2003 | Falanga ................. | H02K 16/02 310/68 R |
| 7,583,000 | B2 | * | 9/2009 | Durham ................. | H02K 29/03 310/179 |

(Continued)

FOREIGN PATENT DOCUMENTS

| | | |
|---|---|---|
| CN | 101951090 A | 1/2011 |
| CN | 103730997 A | 4/2014 |

(Continued)

OTHER PUBLICATIONS

Translation of foreign patent document CN 101951090 A (Year: 2011).*

*Primary Examiner* — Alex W Mok
(74) *Attorney, Agent, or Firm* — Rothwell, Figg, Ernst & Manbeck, P.C.

(57) ABSTRACT

An electric machine 100 is provided, which includes: a stator 10 including a concentrated-winding armature winding 14; an inner rotor 30; and an outer rotor 20, the outer rotor 20 having a plurality of circumferentially spaced magnetic path forming elements 21, the inner rotor 30 having a plurality of rotor teeth 32, which are arranged side by side in the circumferential direction, wound by induction coils 34 and field coils 35; and a rectifier circuit 36 configured to rectify induced current generated by each of induction coils to DC current.

7 Claims, 9 Drawing Sheets

(56) References Cited

U.S. PATENT DOCUMENTS

| | | | |
|---|---|---|---|
| 2003/0080643 A1* | 5/2003 | Kusase | H02K 19/28 310/179 |
| 2007/0252543 A1* | 11/2007 | Rottmerhusen | B60K 6/26 318/255 |
| 2011/0193444 A1* | 8/2011 | Maruyama | H02K 3/522 310/215 |
| 2012/0256510 A1* | 10/2012 | Yamada | H02K 19/12 310/184 |
| 2012/0313492 A1* | 12/2012 | Yamada | H02K 1/24 310/68 D |
| 2013/0134823 A1* | 5/2013 | Yamada | H02K 1/24 310/216.004 |
| 2013/0200623 A1* | 8/2013 | Powell et al. | H02K 7/1823 290/52 |
| 2013/0234553 A1* | 9/2013 | Kusase et al. | H02K 16/02 310/114 |
| 2013/0278096 A1* | 10/2013 | Finkle | H02K 21/46 310/78 |
| 2013/0334937 A1* | 12/2013 | Yamada | H02K 19/10 310/68 D |
| 2014/0028137 A1* | 1/2014 | Kobayashi | H02K 1/17 310/114 |
| 2014/0028160 A1* | 1/2014 | Yamada | H02K 19/12 310/68 B |
| 2014/0035425 A1* | 2/2014 | Dajaku | H02K 3/28 310/198 |
| 2014/0132099 A1* | 5/2014 | Nakatsugawa et al. | H02K 49/102 310/102 R |
| 2014/0285057 A1* | 9/2014 | Aoyama | H02K 3/28 310/210 |
| 2014/0300223 A1* | 10/2014 | Yamada | H02K 19/12 310/54 |
| 2014/0312730 A1* | 10/2014 | Shibata et al. | H02K 21/029 310/191 |
| 2015/0022035 A1* | 1/2015 | Yamada | H02K 19/12 310/54 |
| 2015/0236575 A1* | 8/2015 | Walsh | H02K 21/46 310/156.07 |

FOREIGN PATENT DOCUMENTS

| | | |
|---|---|---|
| JP | 4505524 B2 | 7/2010 |
| JP | 2013-110847 A | 6/2013 |
| JP | 2013-188065 A | 9/2013 |

\* cited by examiner

ELECTRIC MACHINE

TECHNICAL FIELD

The present invention relates to electric machines, more particularly to electric machines of the double-rotor type.

BACKGROUND ART

Electric machines are installed, as power sources, in various apparatuses. In applications to vehicles, for example, an electric machine is installed on a single base to function as a power source of an electric car or together with an internal combustion engine to function as a power source of an electric hybrid car.

In a case of an electric hybrid car, electric machines may be incorporated in a system in combination with an internal combustion engine via a planetary gear set to function as a generator and a motor if required. In this case, it is required to incorporate an internal combustion engine, an electric machine for power generation, and an electric machine for driving in the system together with a planetary gear set to provide an increase in size of the system, making it difficult to install in small sized cars.

JP2013-188065A (or Patent Literature 1) discloses an electric machine configured to combine different functions and function as a generator, a motor and a planetary gear set.

Figure 9:
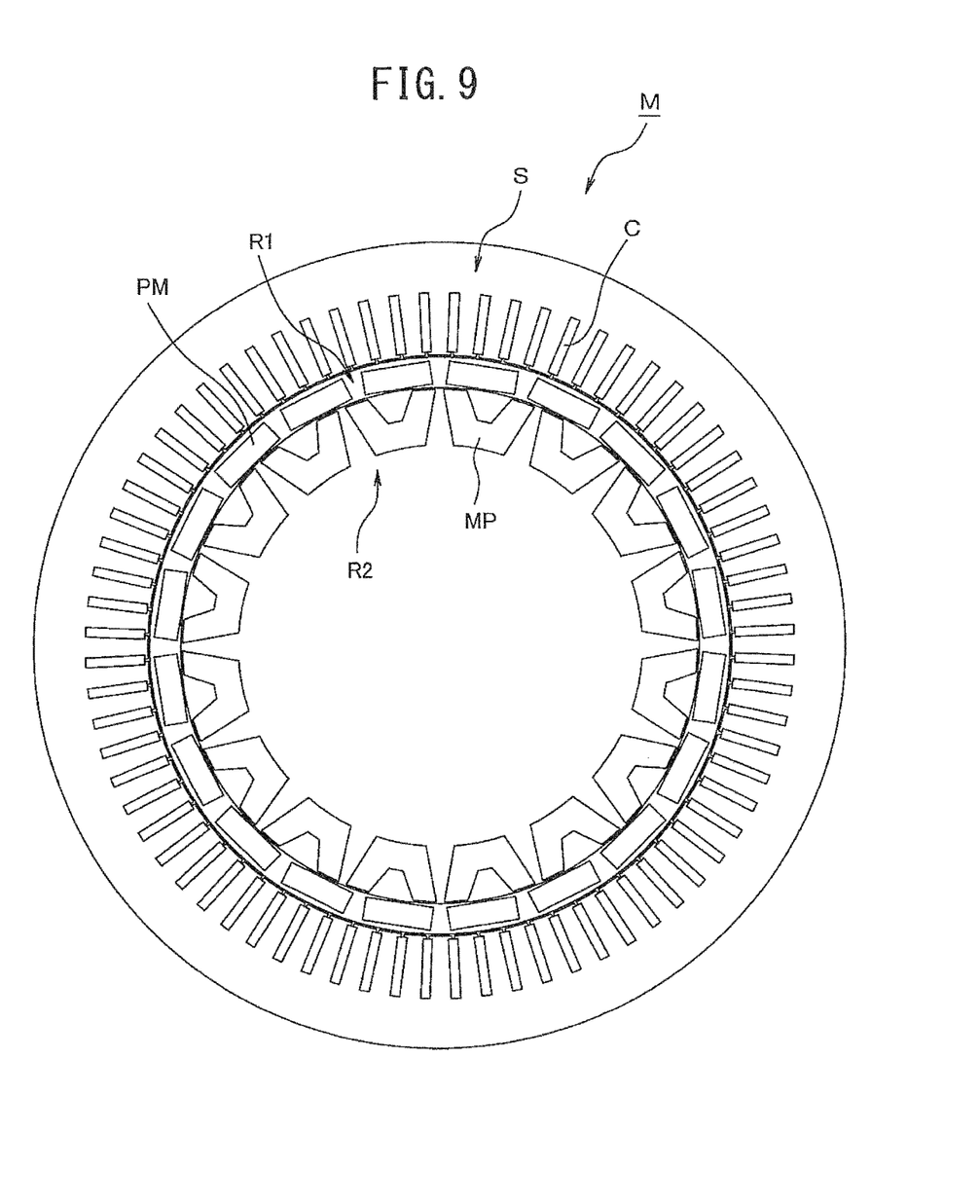
FIG. 9 is a cross section perpendicular to an axis of rotation of an electric machine of the double-shaft type, which is different from the present embodiment.

As shown in FIG. 9, the electric machine M described in JP2013-188065A includes a stator S with an armature winding C having 6 pole-pairs (pole-pair number A), a first rotor R1 with permanent magnets PM having 10 pole-pairs (pole-pair number P), and a second rotor R2 with magnetic paths MP having 16 poles (pole number H=A+P). This electric machine M is configured to be a magnetic modulation double-shaft motor, which uses the principle of magnetic modulation and makes three elements, including stator S, first rotor R1 and second rotor R2, to function as elements of a planetary gear set, i.e., a sun gear, a carrier and a ring gear.

PRIOR ART

Patent Literature

Patent Literature 1: JP2013-188065A

SUMMARY OF INVENTION

Technical Problem

Electric machine M described in JP2013-188065A is difficult to produce a large output by increasing torque density as with an interior permanent magnet (IPM) motor in which the magnetic force of permanent magnets is usable as it is as a magnet torque, and requires use of expensive permanent magnets with large magnetic flux density in order to compensate for a shortage in torque.

Moreover, the structure of electric machine M requires an expensive permanent magnet, which is large in coercive force and small in demagnetization by heat, where such rare and expensive earth elements as Dysprosium (Dy) and Terbium (Tb) are added, such as a Neodymium magnet (Nd—Fe—B magnet), because the fluctuations of magnetic flux interlinking with the permanent magnet is large.

An object of the present invention is to provide an electric machine of the magnetic modulation double-shaft type which, without relying on the use of permanent magnets, effectively uses magnet torque.

Solution to Problem

According to one aspect of the present invention, there is provided an electric machine, comprising: a stator including an armature winding; a first rotor; and a second rotor configured to allow a magnetic path to be created between the stator and the first rotor, the armature winding being a concentrated winding armature winding, the second rotor having a plurality of circumferentially spaced bars of soft magnetic material, the first rotor having a plurality of salient poles, which are arranged side by side in the circumferential direction, wound by induction coils and field coils and a rectifier circuit configured to rectify induced current generated by each of induction coils to dc current.

Advantageous Effect of Invention

Therefore, there is provided an electric machine of the magnetic modulation double-shaft type including the first rotor and second rotor which, without relying on the use of permanent magnets, effectively use magnet torque.

DESCRIPTION OF EMBODIMENTS

Referring to the accompanying drawings, embodiments of the present invention are described in detail below. FIGS. 1 to 9 show an electric machine according to one embodiment of the present invention.

Figure 1:
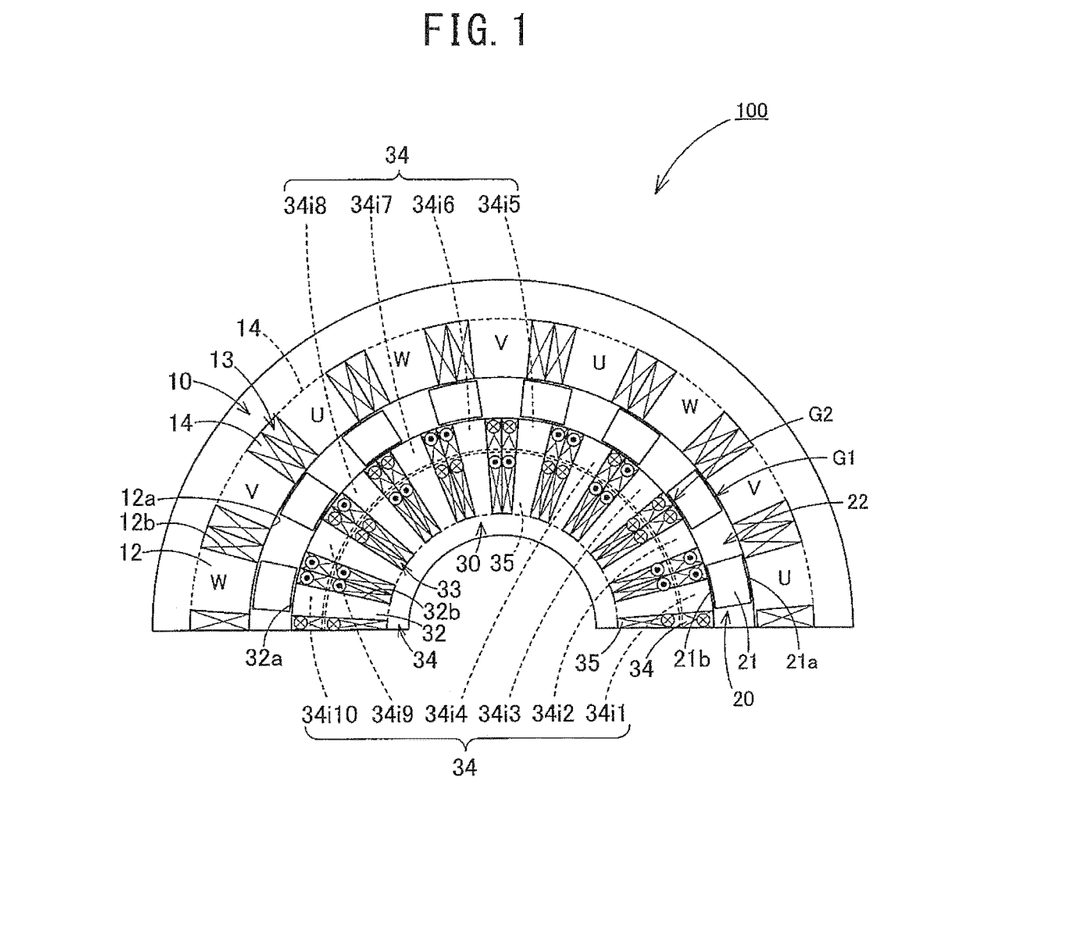
FIG. 1 is a cross section perpendicular to an axis of rotation of one half (½) section of an electric machine according to one embodiment of the present invention.
Figure 2:
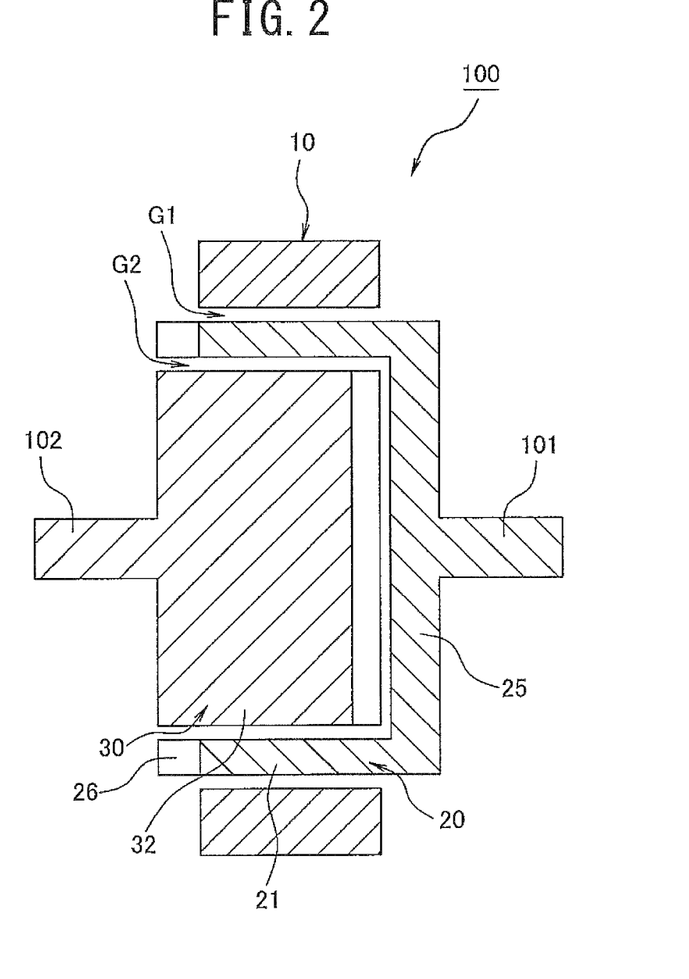
FIG. 2 is a cross section through the axis of rotation showing the schematic overall configuration of the electric machine.

In FIGS. 1 and 2, an electric machine (or a double-rotor motor) 100 includes a stator 10 formed in an approximately cylinder shape, an outer rotor (or a second rotor) 20 surrounded by and rotatably received in a stator 10 and fixed to an outer rotating shaft (also called simply "a rotating shaft") 101 coaxial with the axis of rotation of the outer rotor, and an inner rotor (or a first rotor) 30 fixed to an inner rotating shaft (also called simply "a rotating shaft") 102 coaxial with the axis of rotation of the inner rotor. FIG. 1 shows a radial half part (½) cross sectional view of the electric machine, i.e. a radial displacement of 180 mechanical degrees of 360 mechanical degrees.

Stator 10 is formed with a plurality of circumferentially spaced stator teeth 12 which extend radially toward the axis of rotation of the stator. Stator teeth 12 are formed in a way that their inner peripheral surfaces 12a face outer peripheral surfaces 21a of magnetic path forming elements 21 of an outer rotor 20 to be described later via an air gap G1.

Stator 10 is formed with slots 13, each being defined between mutually facing sides 12b of the adjacent two of stator teeth 12, and an armature winding 14 is provided by winding, with distributed winding, coils through slots 13. Torques to drive an outer rotor 20 and an inner rotor 30 are generated owing to interlinkage of stator magnetic fluxes, which are created by feeding power to armature winding 14, with outer rotor 20 and inner rotor 30.

Outer rotor 20 includes a plurality of prismatic bars or magnetic path forming elements 21, made up of soft magnetic material such as steel with high magnetic permeability, arranged side by side in the circumferential direction. Both end portions in the circumferential direction of each of magnetic path forming elements 21 extend in the axial direction of inner rotor 20. Magnetic path forming elements 21 are connected at both ends by a first disk-shaped end plate 25 and a second end plate 26 formed in a ring, forming a cage-like shape of a squirrel-cage motor.

Inner rotor 20 has magnetic path forming elements 21, as portions to allow magnetic fluxes to pass through, and spaces 22, as portions to prohibit permeation of magnetic fluxes. Magnetic path forming elements 21 and spaces 22 are alternately and continuously arranged in the circumferential direction in a way that a radially outer peripheral surface 21a and a radially inner peripheral surface 21b of each of magnetic path forming elements 21 face the adjacent one of inner peripheral surfaces 12a of stator teeth 12 of stator 10 and the adjacent one of outer peripheral surfaces 32a of rotor teeth 32 of an inner rotor 30 to be described later, respectively.

Outer rotor 20 allows stator magnetic fluxes, which are created by armature winding 14 of stator 10, to effectively pass through magnetic path forming elements 21 on one hand and prohibits permeation of the stator magnetic fluxes through spaces 22. Each of the stator magnetic fluxes runs through one of magnetic path forming elements 21 before entering the adjacent one of rotor teeth 32 of inner rotor 30 from its outer peripheral surface 32a, and then through the adjacent next magnetic path forming element 21 toward stator 10, forming a magnetic path returning to stator 10.

During rotation of outer rotor 20 relative to stator 10, magnetic paths are formed, each being opened or closed by repeatedly switching one of magnetic path forming elements 21, i.e. portions to allow magnetic fluxes to pass through, and spaces 22, i.e. portions to prohibit permeation of magnetic fluxes.

Outer rotor 20 causes the stator magnetic flux, which is created by armature winding 14 and interlinks with the outer rotor 20, to vary in flux density. This variation in flux density causes outer rotor 20 to turn relative to stator 10 because a reluctance torque is generated to seek the lowest magnetic reluctance path through which the stator magnetic flux passes between stator 10 and inner rotor 30 via air gap G1 and later described air gap G2.

Inner rotor 30 includes a plurality of rotor teeth or salient poles 32, which radially extend away from the axis of rotation and arranged side by side in the circumferential direction. The outer periphery surface 32a of each of rotor teeth 32 may face, via air gap G2, one of inner peripheral faces 21b of magnetic path forming elements 21 of outer rotor 20.

Using slots 33, each being defined between mutually facing sides 32b of the adjacent two of rotor teeth 32, as slots 33, an induction coil 34 and a field coil 35 are wound around each of rotor teeth 32. The induction coil 34 is on the side of outer rotor 20 and the field coil 35 is on the side of the axis of rotation such that the induction coil 34 is less remote from stator 10 than the field coil 35 is.

Induction coils 34, which are being grouped as described later, are wound with an identical wiring, by concentrated winding, around rotor teeth 32 in the same winding direction about radial directions of inner rotor 30 toward the axis of rotation and arranged side by side in the circumferential direction of inner rotor 30, and connected in series to form a series connection. At both ends, series connections of induction coils 34 are connected in parallel. Each of induction coils 34 generates (or induces) induced current when flux density of magnetic flux that interlinks with it changes.

Field coils 35 around the adjacent two of rotor teeth 32 are wound, by concentrated winding, in mutually reversed winding directions. Field coils 35 are arranged side by side in the circumferential direction of inner rotor 30 and connected in series one after another as a whole. Each of field coils 35 will work as an electromagnet when it is excited upon supply of field current.

Figure 3:
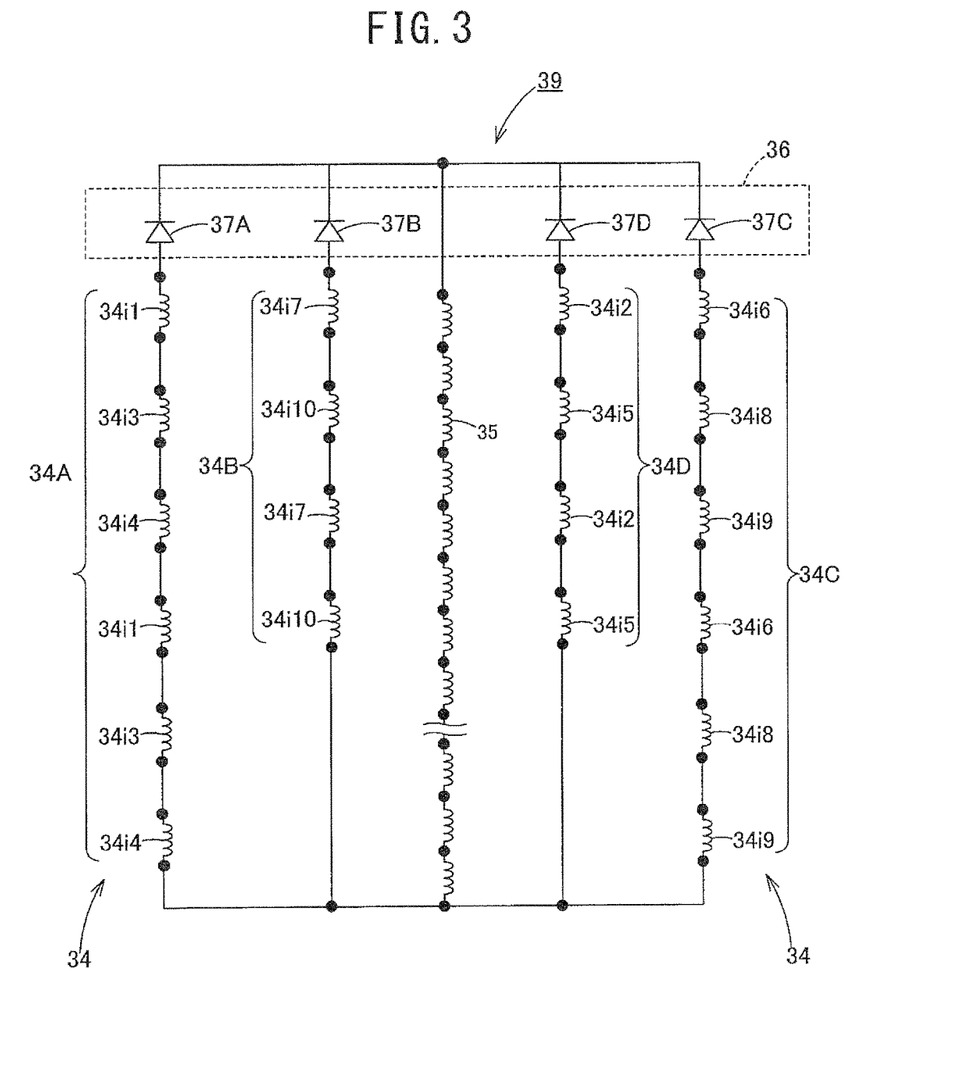
FIG. 3 is a schematic connection of a closed circuit including diodes placed in an inner rotor.

As shown in FIG. 3, induction coils 34 and field coils 35 form a closed circuit 39 together with rectifier circuit 36. Closed circuit 39 forms such a circuit configuration as to cause diodes (rectifier elements) 37A, 37B, 37C and 37D, which constitute rectifier circuit 36, to rectify AC induced currents, in one direction, which are created by the respective groups of induction coils 34 to provide the rectified current, as DC field current, to field coils 35.

This circuit configuration enables rotor teeth 32 to function as electromagnets by exciting field coils 35 by field current given after rectifying induced current created at induction coils 34. The electromagnets by such field coils 35 may cause a deviation, in flux density, of magnetic flux, within magnetic path, that is created by armature winding 14 and passes through magnetic path forming elements 21 of outer rotor 20. Moreover, the electromagnets by these field coils 35 cause an increase in magnetic flux that interlinks with outer rotor 20 from inner rotor 30, providing an assist to torque applied to outer rotor 20.

Moreover, even in case that an increase in the number of poles is required by increasing the number of induction coils 34 and field coils 35, rectifier circuit 36 restrains the number of diodes to be used by grouping connecting field coils 34 for diodes 37A, 37B, 37C and 37D, respectively, and connecting the field coils 34 being grouped in series.

Rectifier circuit 36 allows connection of induction coils 34 to an upstream side of each of diodes 37A, 37B, 37C and 37D after grouping induction coils 34 such that any one of and another of the induction coils 34 of the same group may generate AC induced currents having current waveforms overlapped as much as possible. These induction coils 34 are connected so as to provide a phase difference 180 degrees between an AC waveform of one input induced current to diodes 37A and 37B and an AC waveform of the other input induced current to diodes 37C and 37D to form a neutral point clamp half-wave rectifier circuit for providing an output by carrying out half-wave rectification after inverting one of input induced currents.

This allows rectification and smoothing of AC induced current generated by induction coils 34 to DC current by connecting each of the induction coils 34 to any one of diodes 37A, 37B, 37C and 37D to feed the DC current, as field current, to energize field coils 35 connected in series.

Field coils 35 of closed circuit 39 around the adjacent two of rotor teeth 32 are wound in mutually reversed winding directions. One of the adjacent two of rotor teeth 32 is magnetized to serve as an electromagnet with its S pole facing outer rotor 20 for induction of interlinking magnetic flux from the adjacent one of magnetic path forming elements 21 of outer rotor 20. Moreover, the other of the adjacent two of rotor teeth 32 is magnetized to serve as an electromagnet with its N pole facing outer rotor 20 for induction of magnetic flux toward outer rotor 20.

As previously described, asynchronous magnetic fluxes from stator 10, each containing at least one component not modulated by rotation of outer rotor 20, interlink with rotor teeth 32 of inner rotor 30 from outer periphery surfaces 32a. This causes, in electric machine 100, each of induction coils 34 to produce induced current because the magnetic flux interlinking with the induction coil 34 contains at least one component that fluctuates without being modulated by outer rotor 20 (i.e. without synchronizing with rotation of inner rotor 30). The induced current is rectified by diodes 37A, 37B, 37C and 37D to provide DC field current to energize the associated field coil 35, causing the associated one of rotor teeth 32 to function as an electromagnet to create field magnetic flux.

Additionally, among the stator magnetic flux interlinking with outer rotor 20, at least one of components is modulated by rotation of outer rotor 20, and the magnetic flux of the modulated component synchronizes with rotation of outer rotor 30. Thus, in electric machine 100, a torque is generated.

In electric machine 100, without providing permanent magnets, a magnet torque (a rotating force) is generated to rotate inner rotor 30 relative to stator 10. This inner rotor 30 may smoothly transfer and receive magnetic flux to and from outer rotor 20 bypassing slots 33 because rotor teeth 32, which are arranged side by side, serve as electromagnets whose directions of magnetization (N pole or S pole) are reversed alternatively one after another in the circumferential direction.

In electric machine 100, outer rotor 20 is allowed to rotate at low speeds and inner rotor 30 to rotate at high speeds because outer rotor 20 is rotatable relative to stator 10, and inner rotor 30 is rotatable relative to outer rotor 20 owing to a magnet torque generated by magnetic flux passing through the rotating outer rotor 20, i.e. magnet path forming elements 21, to interlink with inner rotor 30.

Moreover, electric machine 100 may generate torques required for the above mentioned rotational drives depending on the relationship among structures of stator 10, outer rotor 20 and inner rotor 30. Specifically, if "A" is the pole-pair number of armature winding 14 of stator 10, "H" is the number of magnet path forming elements 21 which makes the number of poles of outer rotor 20, and "P" is the pole-pair number of rotor teeth (electromagnets) 32, i.e. the pole-pair number of inner rotor 30, the above-mentioned relationship may be expressed by the following formula (1).

$$H=|A\pm P| \quad (1)$$

If this relationship is satisfied, torques is effectively generated to allow efficient relative rotation between outer rotor 20 and inner rotor 30 with respect to stator 10. For example, the electric machine 100 according to the present embodiment satisfies the formula (1) because A (the pole-pair number of armature winding 14 of stator 10)=6, H (the pole number of magnet path forming elements 21 of outer rotor 20)=16, and P (the pole-pair number of rotor teeth 32 of inner rotor 30)=10.

Moreover, electric machine 100 has outer rotor 20 surrounded by stator 10; inner rotor 30 surrounded by outer rotor 20; an outer rotating shaft 101 rotatable with the outer rotor 20 about the axis of rotation; and an inner rotating shaft 102 rotatable with the inner rotor 30 about the axis of rotation.

Thus, electric machine 100 may be configured as a magnetic modulation double-shaft motor capable of transmitting power using the principle of magnetic modulation, in which stator 10, outer rotor 20, and inner rotor 30 serve as elements of a planetary gear, i.e., a sun gear, a carrier and a ring gear. In electric machine 100 according to the present embodiment, outer rotor 20 formed with magnetic path forming elements 21 functions as a carrier.

Although not illustrated, with this structure, in case of installing electric machine 100 as a drive source together with an engine, i.e. an internal combustion engine, in an electric hybrid car, the electric machine 100 may function as not only a drive source but also a power transmission mechanism by directly coupling outer rotating shaft 101 of outer rotor 20 and inner rotating shaft 102 of inner rotor 30 to components of a power transmission path of the vehicle, respectively, and connecting a battery of the vehicle to armature winding 14 of stator 10 via an inverter.

In this example, in this electric machine 100, armature winding 14 of stator 10 is provided by concentrated winding, but it may be provided by distributed winding. In case of distributed-winding armature winding 14, magnetic flux with less harmonic components is generated and used as a rotating field, causing appearance of torque to drive outer rotor 20 and inner rotor 30.

Figure 4:
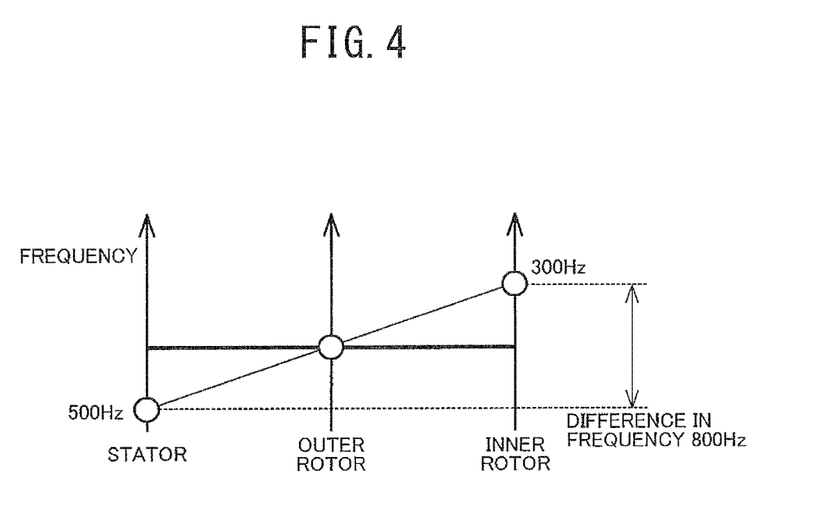
FIG. 4 is a conceptual diagram illustrating the relationship, in rotating speed, among a stator (rotating field), an outer rotor and an inner rotor.

Since this electric machine 100 is a magnetic modulation double-shaft type motor that works like a planetary gear as described before, a set of rotational frequencies of stator 10 (rotating magnetic flux generated by armature winding 14), outer rotor 20 (magnetic path forming elements 21) and inner rotor 30 (induction coils 34) lie on a single line, i.e. collinearity, as shown in FIG. 4 if let vertical axes represent these rotational frequencies. For example, rotational frequency of rotating field of stator 10 can be changed with rotating speed (or rotational frequency) of inner rotor 30 held stationary at 300 Hz. This causes the rotational frequency of rotating field of stator 10 which brings outer rotor 20 to a stop to become 500 Hz, causing rotation at a difference in frequency of 800 Hz between rotating field of stator 10 and rotating speed of inner rotor 30.

In FIG. 4, a ratio of a distance between vertical axes representing rotational frequencies of stator 10 (rotating field) and outer rotor 20 to a distance between vertical axes representing rotational frequencies of inner rotor 30 and outer rotor 20 is a ratio of the reciprocal of A (=6) that is the pole-pair number of armature winding 14 of stator 10 to the reciprocal of P (=10) that is the pole-pair number of inner rotor 30, where: A and P are variables used in formula (1).

Figure 5:
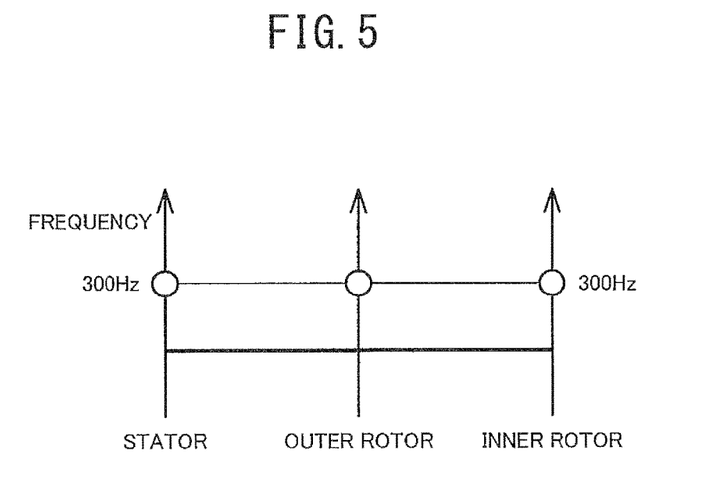
FIG. 5 is a conceptual diagram illustrating the relationship, in rotating speed, among a stator (rotating field), an outer rotor and an inner rotor when they rotate at the same frequency.

This structure causes a state in which there is no difference between rotating field of stator 10 and rotational speed of inner rotor 30 and there is no difference between rotating field of stator 10 and rotational speed of outer rotor 20 in case that rotating field of stator 10, outer rotor 20 and inner rotor 30 rotate in one direction at 300 Hz as shown in FIG. 5.

Figure 6:
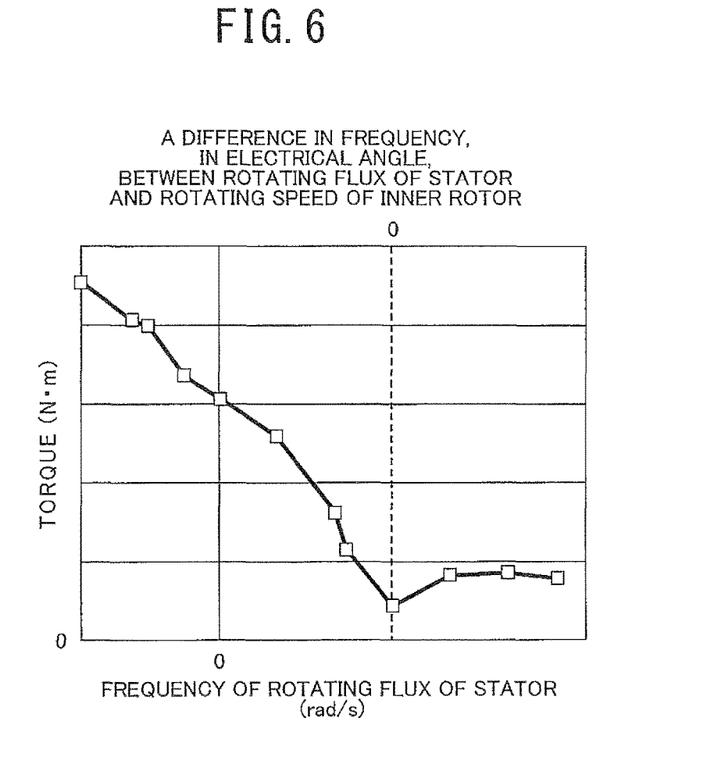
FIG. 6 is a graph showing torque characteristic when an armature winding is wound by distributed winding.

In the above-mentioned state, employing the before-mentioned structure including a stator 10 with a distributed-winding armature winding 14 (i.e. a structure that inductions coils 34 are grouped into two groups and a rectifier circuit 36 using two diodes to provide rectified induced current to field coils 35 to energize them) makes it impossible to create a torque to individually rotate an outer rotor 20 because a difference in frequency between rotating field of stator 10 and rotational speed of an inner rotor 30 is zero as shown in FIG. 6. Since there is no difference between rotating flux of stator 10 and rotating speed of inner rotor 30 (induction coils 34), no change occurs in magnetic flux interlinking with induction coils 34, making it impossible to use a magnet torque because no field current is allowed to pass through field coils 35.

On the other hand, electric machine 1 according to the present embodiment uses stator 10 with concentrated-winding armature winding 14. Since concentrated-winding armature winding 14 is used, magnetic flux that passes through magnetic path forming elements 21 of outer rotor 20 and interlinks with induction coils 34 of inner rotor 30 contains $2^{nd}$ space harmonic component. $2^{nd}$ space harmonic is contained in rotating flux generated by the input supply AC current, which has a fundamental frequency and a sinusoidal waveform, to armature winding 14. $2^{nd}$ space harmonic may oscillate in reverse direction to a rotating fundamental magnetic flux of stator 10 at a frequency that is a two multiple of the fundamental frequency.

This causes rotating field of fundamental frequency that is generated by armature winding 14 of stator 10 and $2^{nd}$ space harmonic component that is superimposed on the rotating field of fundamental to interlink with induction coils 34, causing magnetic flux that changes depending on a difference in rotating speed between frequency of the rotating field and rotating frequency of inner rotor 30 and magnetic flux that changes depending on a difference in rotating speed between frequency of $2^{nd}$ space harmonic and rotating frequency of inner rotor 30 induction coils 34 to generate induced current. In this case, induction coils 34 generates induced current depending on a difference in frequency between inner rotor 30 and magnetic flux that interlinks with inner rotor 30. This means that induction coils 34 generate induced current depending on each difference in frequency because rotating frequency (rotating speed) relative to inner rotor 30 of rotating field of fundamental, which is generated by armature winding 14 of stator 10 by input supply of AC current, differs from that of $2^{nd}$ space harmonic component, which is superimposed on the rotating field.

Figure 7:
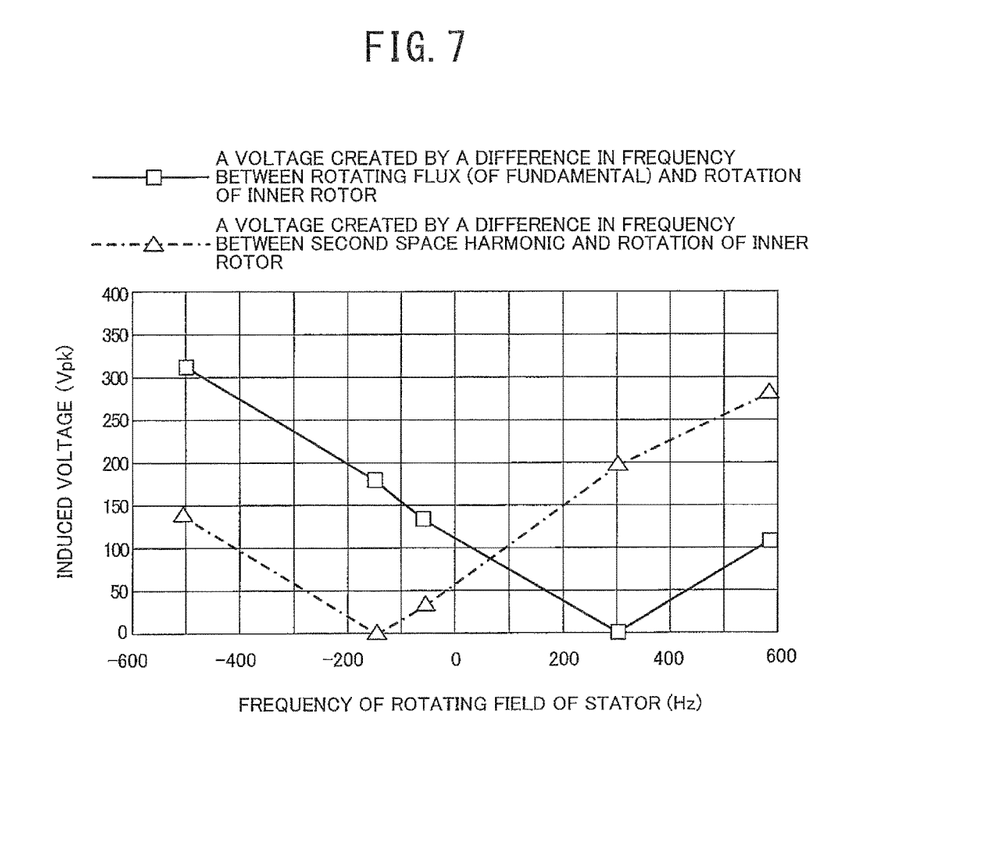
FIG. 7 is a graph showing induced voltage generated depending on magnetic flux that interlinks with induced coils.
Figure 8:
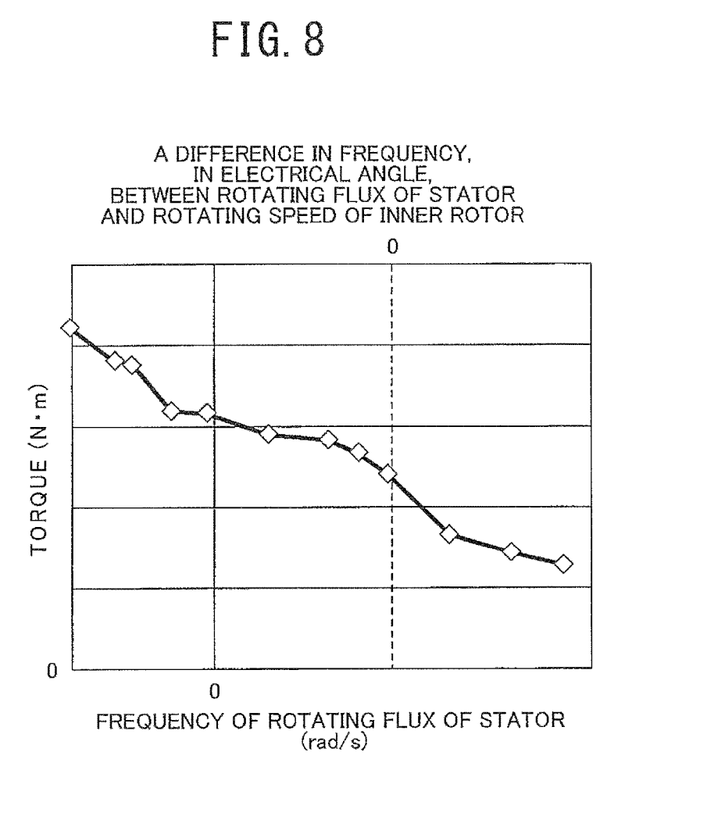
FIG. 8 is a graph showing torque characteristic when an armature winding according to the present embodiment is wound by concentrated winding.

As indicated by induced voltage of induction characteristics at induction coils 34 in FIG. 7, rotating field with fundamental frequency generated at armature coils 14 of stator 10 differs, in changing trend of rotating frequency (rotating speed) relative to inner rotor 30, from $2^{nd}$ space harmonic component superimposed on the rotating field. Rotating field with fundamental frequency generated at armature winding 14 of stator 10 and $2^{nd}$ space harmonic component superimposed on the rotating field become the same speed (frequency) as inner rotor 30 at different timings, so that they may cause induction coils 34 to generate no induced voltage at respective timings.

Waveform of induced voltage may differ with respect to each of induction coils 34i1 through 34i10 because timing at which $2^{nd}$ space harmonic component is superimposed on rotating field with fundamental frequency generated at armature winding 14 of stator 10 differs in the circumferential direction. For this reason, grouping induction coils 34 only on whether waveform of induced current is in-phase or inversed-phase may result in leaving a position at which inversed-phase occurs upon synthesis over a wide range to exhibit a loss. Induction coils 34i1 through 34i10 are arranged one after another counterclockwise viewing in FIG. 1, in which only one half of electric machine 100 is illustrated, in a similar way with regularity. In other words, induction coils 34 are grouped and arranged in an identical sequence pattern in the circumferential direction of inner rotor 30 (see FIG. 3).

Therefore, in electric machine 100 according to the present embodiment, four diodes 37A through 37D are used as rectifier elements of rectifier circuit 36 and connected to induced coils 34i1 through 34i10 which are grouped such that AC wave forms of induced currents generated within each group of induction coils 34i1 through 34i10 overlap one after another as much as possible. That is to say, induction coils 34i1 through 34i10 are grouped such that current value of induction current generated by each of induction coils 34 may not decrease, as much as possible, owing to so-called offset upon synthesis before being rectified. In other words, in closed circuit 39, induction coils 34i1 through 34i10 are grouped into four groups 34A, 34B, 34C and 34D and connected in series in each group such that the range where waveform of induced current is inversed-phase is minimized in each group.

Specifically, induced current generated at group 34A of induction coils 34i1, 34i3 and 34i4 is inversed-phase relationship with induced current generated at group 34C of induction coils 34i6, 34i8 and 34i9, and induced current generated at group 34B of induction coils 34i7 and 34i10 is inversed-phase relationship with induced current generated at group 34D of induction coils 34i2 and 34i5.

Among them, induction coils of groups 34A and 34B exhibit current waveforms generally varying in-phase, but after they are further distinguished or grouped by the size of range where waveform is inversed-phase, induction coils 34 are combined in each of groups 34A and 34B in order to avoid, as much as possible, a drop in current value of synthesized current when induced currents are joined upstream of each of diodes 37 and 37D. After they are further distinguished in a similar manner, induction coils 34 are combined in each of groups 34C and 34D in order to avoid, as much as possible, a drop in current value of synthesized current when induced currents are joined upstream of each of diodes 37 and 37D.

As a result, by grouping induction coils 34 into four groups 34A, 34B, 34C and 34D and connecting them to diodes 37A, 37B, 37C and 37D in series, respectively, to pass currents via the diodes, induced currents can be rectified without any appreciable loss to provide smoothed, as much as possible, DC current to be supplied to energize field coils 35 connected in series.

Therefore, waveform of induced current generated by magnetic flux that interlinks with outer rotor 20 differs at positions being arranged in the circumferential direction because $2^{nd}$ space harmonic component is superimposed on rotating flux with fundamental frequency generated at armature winding 14 of stator 10. Even at timing where a torque applied to outer rotor 20 is not generated in case of distributed-winding armature winding 14 as shown in FIG. 6, field coils 35 can be energized with field current provided by generating induced current at induced coils 34, enabling magnet torque to work as a torque applied to outer rotor 20.

As shown in FIG. 9, a known electric machine M described in Patent Literature 1 (JP2013-188065A) is configured as a magnetic modulation double-shaft motor capable of transmitting power using the principle of magnetic modulation, which functions as elements of a planetary gear set, i.e., a sun gear, a carrier and a ring gear, in which A (the pole-pair number of an armature winding C of a stator S)=6, P (the pole-pair number of permanent magnets PM of an outer rotor R1)=10, and H (the pole number of modulation elements MP, i.e. magnetic path forming elements, of inner rotor 20)=A+P=16.

In comparison to the known electric machine M, electric machine 100, which is configured to satisfy the formula (1) owing to the structure that A (pole-pair number of armature winding 14 of stator 10)=6, P (pole-pair number of rotor teeth 32 of inner rotor 30) and H (pole number of magnetic path forming elements 21, i.e. modulation elements, of outer rotor 20)=A+P=16, has modulation elements (magnetic path forming elements) 21 on outer rotor 20 and electromagnets (rotor teeth 32) on inner rotor 30. As indicated in graph of FIG. 8, electric machine 100 and known electric machine M provide substantially the same torque characteristics without such rotating condition that torque may not be obtained with the distributed-winding armature winding 14. Thus, electric machine 100 can provide sufficient torque by creating optimal induced current and field current because winding amounts of induction coil 34 and field coil 35 wound around each of magnetic pole cores 32 and their proportion are adjustable.

Moreover, in electric machine 100, induction coils 34 and field coils 35 are wound around rotor teeth 32 of inner rotor 30, allowing an increase in the pulsation of magnetic resistance with the appropriate length of each of coils in the axial direction ensured. This causes supply of a large amount of field current to field coils 35 by allowing generation of a large amount of induced current at induction coils 34, allowing generation of sufficient electromagnetic force to contribute to drive for rotation as magnet torque.

It might be possible to arrange sufficiently salient poles on outer rotor 20 to provide induction coils and field coils wound around the salient poles, as with electric machine M. In this case, the diameter of inner rotor becomes relatively too short to ensure sufficiently long pulsation of magnetic resistance, failing to provide sufficiently large electromagnetic force (or magnet torque). This means that the structure of electric machine 100 according to the present embodiment is preferable.

In electric machine 100 according to the present embodiment, outer rotor 20 has a plurality of magnetic path forming elements 21 and inner rotor 30 has induced coil 34 and field coil 35 on each of rotor teeth 32 of inner rotor 30. Stator magnetic fluxes created after providing AC drive current to armature winding 14b of stator 10 pass through magnetic path forming elements 21 of outer rotor 20 to interlink with rotor teeth 32 of inner rotor 30. This causes, in electric machine 100, each of induction coils 34 to produce induced current. The induced current is rectified by diode 37A or 37B to provide DC field current to energize the associated field coil 35, causing the associated one of magnetic pole cores 32 to serve as an electromagnet to create field magnetic flux.

This enables electric machine 100 to form closed magnetic paths, without relying on permanent magnets, for returning not only magnetic flux created within stator 10 but also magnetic flux created within inner rotor 30 to stator 10 via outer rotor 20, i.e. via magnetic path forming elements 21.

Therefore, in electric machine 100, a reluctance torque is generated to seek the lowest magnetic reluctance path. Additionally, a magnet torque is generated by causing rotor teeth 32 of inner rotor 30 to work as electromagnets.

As a result, there is provided a magnetic modulation two-shaft type electric machine 100 including an outer rotor 20 effectively usable of a magnet torque, without relying on permanent magnets, and an inner rotor 30.

Induction coils 34 are wound, by concentrated winding, around the outer periphery sides of rotor teeth 32 of inner rotor 30 in the same winding direction, and field coils 35 around the inner periphery sides of the adjacent two of rotor teeth 32 are wound, by concentrated winding, in mutually reversed winding directions. This enables, in electric machine 100, induction coils 34 to efficiently generate induced current by causing stator magnetic flux, which is created by armature winding of stator 10, to effectively interlink with induction coils 34 via outer rotor 20, i.e. via magnet path forming elements 21, thus magnetizing field coils 35 depending on their winding directions to make the N pole of one electromagnet and the S pole of the adjacent electromagnet to face the adjacent one of magnet path forming elements 21 of outer rotor 20 to form a suitable magnetic circuit.

Moreover, since armature winding 14 of stator 10 is wound by concentrated winding, induced current is generated because space harmonic component contained in rotating flux that interlinks with inner rotor 30 interlinks with induction coils 34. Since induced currents provided after being grouped by waveforms of the induced currents are rectified without any appreciable loss by diodes 37A through 37D, a torque can be effectively obtained by generating a great magnet torque by field coils 35.

As a second aspect of the present embodiment, not illustrated, permanent magnets may be embedded in rotor teeth 32, respectively, of inner rotor 30. Each of the permanent magnets is arranged in a way that the direction of magnetization of magnetic poles (N pole, S pole) becomes the same as the direction of magnetization when the adjacent one of rotor teeth 32 is caused to work as an electromagnet by rectification by diodes 37A, 37B. In this case, a torque, which drives inner rotor 30, i.e. rotating inner shaft 102, is increased because a magnetic force of permanent magnet is added to a magnetic force of the electromagnet of each of rotor teeth 32. Since the strength of a magnetic force required for a permanent magnet to produce is sufficient to provide an assist to an electromagnetic force created by each induction coil 34, there is no need for such a rare and expensive permanent magnet as a Neodymium magnet and thus the permanent magnet may be selected from inexpensive permanent magnets whose stable supply is ensured. But, a rare and expensive Neodymium magnet may be used if it is requested to provide a stable large torque.

Moreover, as a third aspect of the present embodiment, the present embodiment is not limited by the radial gap construction forming diametrically spaced air gaps G1, G2 like electric machine 100 and may be constituted in an axial gap construction forming air gap(s) in a direction along the axis of rotation. In this case, too, armature winding, magnetic path forming elements and induction coils are arranged on a stator and two rotors which are arranged in the direction along the axis of rotation.

Whilst the above described stator 10, outer rotor 20 and inner rotor 30 of the electric machine 100 of the radial gap construction are made of laminated structures by laminating electromagnetic steel sheets, it is possible, for example, to use so-called soft magnetic composite cores (SMC cores) which may be described as powder magnetic cores resulting from iron powder compression molding and heat treating soft magnetic composites (SMCs) of ferromagnetic powder particles, such as, iron powder particles, surrounded by an electrical insulating film. The SMC core is suitable for the axial gap construction because of its ease of molding.

Use of electric machine 100 is not limited to automotive use, and it is possible, for example, to suitably use it in wind-power generation or use it as a drive power in machine tools.

Although embodiments of the present invention have been described, it will be apparent to person skilled in the art that modifications may be made without departing from the scope of the present invention. All such modifications and equivalents thereof are intended to be covered by the following claims described in scope of claims.

DESCRIPTION OF SIGNS 10 stator
12 stator teeth
14 armature winding
20 outer rotor (second rotor)
21 magnetic path forming element
22 space
30 inner rotor (first rotor)
32 rotor teeth (salient pole)
34 induction coil
35 field coil
36 rectifier circuit
37A, 37B, 37C, 37D diode (rectifier element)
39 closed circuit
100 electric machine
101 outer rotating shaft
102 inner rotating shaft
G1, G2 air gap

The invention claimed is:

1. An electric machine, comprising:
a stator including an armature winding;
a first rotor; and
a second rotor configured to allow a magnetic path to be created between the stator and the first rotor,
the armature winding being a concentrated winding armature winding,
the second rotor having a plurality of circumferentially spaced bars of soft magnetic material,
the first rotor having a plurality of salient poles, which are arranged side by side in the circumferential direction, wound by induction coils and field coils and a rectifier circuit configured to rectify induced current generated by each of induction coils to DC current;
wherein the induction coils are arranged between the second rotor and the field coils in a radial direction relative to an axis of rotation of the first and second rotors,
wherein the rectifier circuit includes a plurality of rectifier elements, the induction coils are arranged in plural groups each connected to an upstream side of the plurality of rectifier elements such that any one of and another one of the induction coils of a same group generate induced currents that have substantially overlapped current waveforms, and the field coils are connected to a downstream side of each of the plurality of rectifier elements, and
wherein the induction coils in each group are connected in series on the upstream side of the corresponding one of the plurality of rectifier elements.

2. The electric machine as recited in claim 1, wherein the induction coils are grouped into a plurality groups and connected in series in each group such that the range where waveform of induced current is inversed-phase is minimized in each group.

3. The electric machine as recited in claim 1, wherein the induction coils are grouped and arranged in an identical sequence pattern in the circumferential direction of the first rotor.

4. The electric machine as recited in claim 1, wherein each respective salient pole is wound by one of the induction coils and one of the field coils.

5. The electric machine as recited in claim 4, wherein the field coils wrapped around two adjacent salient poles are wound in mutually reversed winding directions.

6. The electric machine as recited in claim 4, wherein one of the field coils, wound around a respective salient pole, is longer than one of the induction coils, wound around the respective salient pole, in the radial direction.

7. The electric machine as recited in claim 1, wherein the stator is formed with a plurality of stator teeth, and the stator teeth are wound by armature winding with concentrated winding wrapped around outer periphery sides of the stator teeth; and
wherein each stator tooth is wider than the salient pole in the circumferential direction.

* * * * *